United States Patent
Zhu et al.

(10) Patent No.: US 12,088,747 B2
(45) Date of Patent: *Sep. 10, 2024

(54) METHOD FOR MAKING A METAL MATERIAL COMPOSITE

(71) Applicant: JIANGSU KANGRUI NEW MATERIAL TECHNOLOGY CO., LTD., Jiangyin (CN)

(72) Inventors: Wei Zhu, Jiangyin (CN); Zhong Zhang, Jiangyin (CN); Pengfei Li, Jiangyin (CN)

(73) Assignee: Jiangsu Kangrui New Material Technology Co., Ltd., Jiangyin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/026,737

(22) PCT Filed: Feb. 24, 2022

(86) PCT No.: PCT/CN2022/077563
§ 371 (c)(1),
(2) Date: Mar. 16, 2023

(87) PCT Pub. No.: WO2022/183956
PCT Pub. Date: Sep. 9, 2022

(65) Prior Publication Data
US 2023/0339210 A1    Oct. 26, 2023

(30) Foreign Application Priority Data

Mar. 5, 2021   (CN) .......................... 202110246015.6
Mar. 5, 2021   (CN) .......................... 202110246026.4
(Continued)

(51) Int. Cl.
*H04M 1/02*   (2006.01)
*B21D 51/16*  (2006.01)
(Continued)

(52) U.S. Cl.
CPC ............ *H04M 1/026* (2013.01); *B21D 51/16* (2013.01); *B32B 15/01* (2013.01); *B32B 15/012* (2013.01);
(Continued)

(58) Field of Classification Search
CPC ............ B21B 47/00; B21B 1/227; B21B 1/38
See application file for complete search history.

(56) References Cited

U.S. PATENT DOCUMENTS 5,115,660 A * 5/1992 Kurobe ................... B21B 47/04
                                                      72/197

FOREIGN PATENT DOCUMENTS

CN      2000312979 A    11/2000
CN         1586751 A     3/2005
(Continued)

OTHER PUBLICATIONS

CN 110654081 A For and English translation Zhu (Year: 2020).*
(Continued)

*Primary Examiner* — Jason L Vaughan
*Assistant Examiner* — Amanda Kreiling
(74) *Attorney, Agent, or Firm* — Zhu Lehnhoff LLP

(57) ABSTRACT

The present invention relates to the technical field of material processing and provides a method for making a metal material composite, including: contacting a first surface of a first plate with a second surface of a second plate; placing the first plate and the second plate in a recess in a circumferential direction of a first roller such that a third surface of the second plate contacts a bottom wall of the recess in a circumferential, the third surface being opposite the second surface, the first plate having a greater hardness than the second plate; and controlling a first roller and a second roller to rotate, thereby rolling to combine the first plate and the second plate into a composite plate, where a fourth surface
(Continued)

of the first plate contacts a surface of the second roller and the fourth surface is opposite the first surface during the rolling. According to the method for making a metal material composite in the present invention, flashings and burr on the side edges of a composite plate are avoided by placing the first plate and the second plate in a recess for machining.

19 Claims, 6 Drawing Sheets

(30) Foreign Application Priority Data

| Mar. 5, 2021 | (CN) | 202110247262.8 |
|---|---|---|
| Mar. 5, 2021 | (CN) | 202110247263.2 |
| Mar. 5, 2021 | (CN) | 202110247280.6 |
| May 8, 2021 | (CN) | 202110498802.X |
| May 8, 2021 | (CN) | 202110498999.7 |
| May 8, 2021 | (CN) | 202110499000.0 |
| May 8, 2021 | (CN) | 202110499008.7 |
| May 8, 2021 | (CN) | 202110499009.1 |
| Oct. 12, 2021 | (WO) | PCT/CN2021/123163 |
| Nov. 1, 2021 | (WO) | PCT/CN2021/123161 |
| Nov. 1, 2021 | (WO) | PCT/CN2021/123162 |

(51) Int. Cl.
B32B 15/01 (2006.01)
B32B 15/20 (2006.01)
B32B 37/00 (2006.01)
B32B 37/06 (2006.01)
B32B 37/10 (2006.01)
B32B 38/00 (2006.01)
B32B 38/16 (2006.01)

(52) U.S. Cl.
CPC ............ *B32B 15/017* (2013.01); *B32B 15/20* (2013.01); *B32B 37/0053* (2013.01); *B32B 37/06* (2013.01); *B32B 37/10* (2013.01); *B32B 38/0012* (2013.01); *B32B 38/162* (2013.01); B32B 2307/536 (2013.01); B32B 2307/538 (2013.01); B32B 2307/54 (2013.01); B32B 2307/542 (2013.01); B32B 2307/7375 (2023.05); B32B 2307/7376 (2023.05); B32B 2311/18 (2013.01); B32B 2311/24 (2013.01); B32B 2311/30 (2013.01); Y10T 428/12201 (2015.01); Y10T 428/12743 (2015.01)

(56) References Cited

FOREIGN PATENT DOCUMENTS

| CN | 101559557 A | 10/2009 |
|---|---|---|
| CN | 102658686 A | 9/2012 |
| CN | 202623400 U | 12/2012 |
| CN | 102848136 A | 1/2013 |
| CN | 103394975 A | 11/2013 |
| CN | 203494905 U | 3/2014 |
| CN | 204701208 U | 10/2015 |
| CN | 105034526 A | 11/2015 |
| CN | 105478475 A | 4/2016 |
| CN | 105499269 A | 4/2016 |
| CN | 105798062 A | 7/2016 |
| CN | 106862271 A | 6/2017 |
| CN | 107278385 A | 10/2017 |
| CN | 107377656 A | 11/2017 |
| CN | 206728104 U | 12/2017 |
| CN | 107613048 A | 1/2018 |
| CN | 107770306 A | 3/2018 |
| CN | 207442919 U | 6/2018 |
| CN | 208826189 U | 5/2019 |
| CN | 209105265 U | 7/2019 |
| CN | 110654081 A | 1/2020 |
| CN | 110665968 A | 1/2020 |
| CN | 110681694 A | 1/2020 |
| CN | 110883093 A | 3/2020 |
| CN | 111318564 A | 6/2020 |
| CN | 111421446 A | 7/2020 |
| CN | 111715710 A | 9/2020 |
| CN | 112139237 A | 12/2020 |
| CN | 212240477 U | 12/2020 |
| JP | 2003094318 A | 4/2003 |
| JP | 2009255171 A | 11/2009 |
| JP | 2015128883 A | 7/2015 |
| KR | 20180102844 A | 9/2018 |
| WO | 2016207063 A1 | 12/2016 |
| WO | 2018181717 A1 | 10/2018 |

OTHER PUBLICATIONS

CN 110665968 A For and English translation Liu (Year: 2020).*
International Search Report, issued in PCT/CN2022/077564, dated May 31, 2022.
Written Opinion, issued in PCT/CN2022/077564, dated May 31, 2022.
International Search Report, issued in PCT/CN2022/077565, dated May 27, 2022.
Written Opinion, issued in PCT/CN2022/077565, dated May 27, 2022.
International Search Report, issued in PCT/CN2022/077563, dated May 26, 2022.
Written Opinion, issued in PCT/CN2022/077563, dated May 26, 2022.
International Search Report, issued in PCT/CN2021/123162, dated Jan. 17, 2022.
Written Opinion, issued in PCT/CN2021/123162, dated Jan. 17, 2022.
International Search Report, issued in PCT/CN2021/123163, dated Jan. 18, 2022.
Written Opinion, issued in PCT/CN2021/123163, dated Jan. 18, 2022.
International Search Report, issued in PCT/CN2021/123161, dated Mar. 2, 2022.
Written Opinion, issued in PCT/CN2021/123161, dated Mar. 2, 2022.

* cited by examiner

METHOD FOR MAKING A METAL MATERIAL COMPOSITE

TECHNICAL FIELD

The present invention relates to the technical field of material processing, more particularly, to a method for making a metal material composite.

BACKGROUND ART

Metal composite rolling is a process in which metals having different physical and chemical properties are rolled to combine firmly over an entire contact surface. A composite workpiece obtained through the rolling process has such defects as flashings and burrs to be addressed in a subsequent production process, which brings about additional production costs.

Taking the process of rolling a steel plate and an aluminum alloy plate as an example, in the prior art, a rolling device with four rollers is employed to conduct rolling, wherein the four rollers include two working rollers and two side rollers, the two working rollers roll the steel plate and the aluminum alloy plate and shape the resulting plate, and the two side rollers roll side edges of the composite workpiece during or after the shaping process. When the device is working, it's preferable not to press the side rollers too tightly against side surfaces of the working rollers, otherwise, the damage is likely to happen to the rolling device due to excessive friction between the working rollers and the side rollers, resulting in an inaccurate width dimension of the composite workpiece; however, if the side rollers are merely in loose contact with the working rollers or the raw material has a significant dimensional inconstancy, flashings and burrs are also likely to occur in a width direction of the composite workpiece.

SUMMARY OF THE INVENTION

The present invention provides a method for making a metal material composite to solve the problem in the prior art that the rolling process is not precise enough and thus flashings and burrs are likely to occur. The method prevents flashings and burrs on a side of a composite plate by placing a first plate and a second plate in a recess for machining.

A method for making a metal material composite is provided herein, including:
contacting a first surface of a first plate with a second surface of a second plate;
placing the first plate and the second plate in a recess in a circumferential direction of a first roller such that a third surface of the second plate contacts a bottom wall of the recess, wherein the third surface is opposite the second surface, and the first plate has a greater hardness than the second plate; and
controlling a first roller and a second roller to rotate, thereby rolling to combine the first plate and the second plate into a composite plate, wherein a fourth surface of the first plate contacts a surface of the second roller, and the fourth surface is opposite the first surface during the rolling.

According to the method for making a metal material composite provided herein, before contacting a first surface of a first plate with a second surface of a second plate,
at least one of the first surface and the second surface is roughened so that at least one of the first surface and the second surface is provided with a plurality of striations, a pitch is provided between adjacent striations, and a number of the striations of which every two adjacent ones are distanced by a preset pitch is configured to be greater than or equal to a preset proportion of a total number of the striations.

According to the method for making a metal material composite provided herein, in the step of roughening the first surface,
the preset pitch between adjacent striations of the first surface is 0.005 mm to 0.03 mm, and the preset proportion is 90%.

According to the method for making a metal material composite provided herein, in the step of roughening the first surface,
the preset pitch between adjacent striations of the first surface is 0.01 mm to 0.02 mm, and the preset proportion is 90%.

According to the method for making a metal material composite provided herein, in the step of roughening the first surface,
the preset pitch between adjacent striations of the first surface is 0.01 mm to 0.02 mm, and the preset proportion is 80%.

According to the method for making a metal material composite provided herein, in the step of roughening the first surface,
the preset pitch between the adjacent striations of the first surface is 0.01 mm to 0.02 mm, and the preset proportion is 70%.

According to the method for making a metal material composite provided herein, in the step of roughening the first surface,
the preset pitch between adjacent striations of the first surface is 0.01 mm to 0.02 mm, and the preset proportion is 50%.

According to the method for making a metal material composite provided herein, in the step of roughening at least one of the first surface and the second surface,
the striations are formed by rubbing at least one of the first surface and the second surface with a roughening friction roller, wherein the roughening friction roller comprises a grinding belt, the linear speed of the grinding belt: 9-10 m/S, the speed of the titanium plate is 4-6 m/min, the overlapping amount of the grinding belt is 0.02 mm, the material of the grinding belt support roller is rubber, the hardness is HS60-75.

According to the method for making a metal material composite provided herein, in the step of roughening at least one of the first surface and the second surface,
the striations are formed by rubbing at least one of the first surface and the second surface with the roughening friction roller, wherein the roughening friction roller includes a grinding wheel, a mesh number of the grinding wheel is 40 to 120, the grinding wheel is subjected to a pressure of 0.1 MPa to 0.5 MPa during operation, and a diameter of the grinding wheel is 200 mm to 400 mm.

According to the method for making a metal material composite provided herein, in the step of roughening the first surface includes:
removing debris from the first surface; or
after the step of roughening the second surface, the method further includes:
removing debris from the second surface.

According to the method for making a metal material composite provided herein, the step of roughening the first surface includes:

acquiring a number of the striations per unit area of the first surface;

determining that the number of the striations per unit area of the first surface is smaller than a corresponding preset value, and adjusting a position of the roughening friction roller for roughening treatment so that the roughening friction roller fully contacts the first surface; or the step of roughening the second surface includes:

acquiring a number of the striations per unit area of the second surface;

determining that the number of the striations per unit area of the second surface is smaller than a corresponding preset value, and adjusting a position of the roughening friction roller for roughening treatment so that the roughening friction roller fully contacts the second surface.

According to the method for making a metal material composite provided herein, before the step of controlling a first roller and a second roller to rotate, thereby rolling to combine the first plate and the second plate into a composite plate, the method further includes:

controlling the first plate and the second plate to be heated to a preset temperature.

According to the method for making a metal material composite provided herein, after the step of controlling a first roller and a second roller to rotate, thereby rolling to combine the first plate and the second plate into a composite plate, the method further includes:

subjecting the composite plate to a solid solution treatment; and subjecting the composite plate to an aging treatment after the solid solution treatment.

According to the method for making a metal material composite provided herein, the solution treatment is performed at 480° C. to 540° C. for 45 min to 65 min;

the aging treatment is performed at 160° C. to 200° C. for 5 h to 7 h.

According to the method for making a metal material composite provided herein, the method further includes, before the step of contacting the first surface of the first plate with the second surface of the second plate, prefabricating the first plate and the second plate in a thickness ratio of 1.5:1.0; and in the step of controlling the first roller and the second roller to rotate, thereby rolling to combine the first plate and the second plate into the composite plate, controlling a differential speed ratio of the first roller to the second roller to be 1:1.05, and a reduction rate of rolling to be 20% to 40%.

According to the method for making a metal material composite provided herein, before the step of contacting the first surface of the first plate with the second surface of the second plate, a roughness of the first surface is prefabricated to be 0.8 Ra to 4.0 Ra.

According to the method for making a metal material composite provided herein, before the step of contacting the first surface of the first plate with the second surface of the second plate, a roughness of the second surface is prefabricated to be 4 Ra to 10 Ra.

According to the method for making a metal material composite provided herein, the first plate is a stainless steel plate, and the second plate is an aluminum plate.

According to the method for making a metal material composite provided herein, in the step of controlling the first roller and the second roller to roll and combine the first plate and the second plate into the composite plate, a shear strength $\tau = a*b*K1*K2*\sigma_{soft}$ is obtained for the composite plate, wherein a is a length of the first plate, b is a width of the first plate, K1 is a roughened area ratio of the first plate, and a value range of K1 is 1.5 to 3; K2 is a degree of bonding between the first plate and the second plate, a value range of K2 is 0.15 to 0.3, and when K1*K2>1, a product of K1 and K2 takes a value of 1; the $\sigma_{soft}$ is a yield strength of the second plate, and a value range of the $\sigma_{soft}$ is 350 MPa to 412 MPa.

According to the method for making a metal material composite provided herein, before the step of roughening the first surface, the first plate is prefabricated to have an elongated shape;

in the step of roughening the first surface, controlling the intersection angle between the length direction of the striations of the first surface and the width direction of the first plate to form the first preset intersection angle; or before the step of roughening the second surface, the second plate is prefabricated to have an elongated shape;

in the step of roughening the second surface, controlling the intersection angle between the length direction of the striations of the second surface and the width direction of the second plate to form the second preset intersection angle.

According to the method for making a metal material composite provided herein, the first plate and the second plate are placed in the recess of the first roller to limit the side edges of the first plate and the second plate, burrs and flashings generated on the side edges of the first plate and the second plate due to the smaller hardness of the first plate are effectively avoided, therefore, after the first plate and the second plate are rolled to form a composite plate, the composite plate may get rid of burrs and flashings.

BRIEF DESCRIPTION OF THE DRAWINGS

To explain the technical solutions of the present invention or the prior art more clearly, the following will briefly introduce the drawings necessary for the description of the embodiments or the prior art. Apparently, the drawings in the following description illustrate only some embodiments of the present invention, other drawings may be obtained by those of ordinary skills in the art based on these drawings without inventive work.

Figure 1:
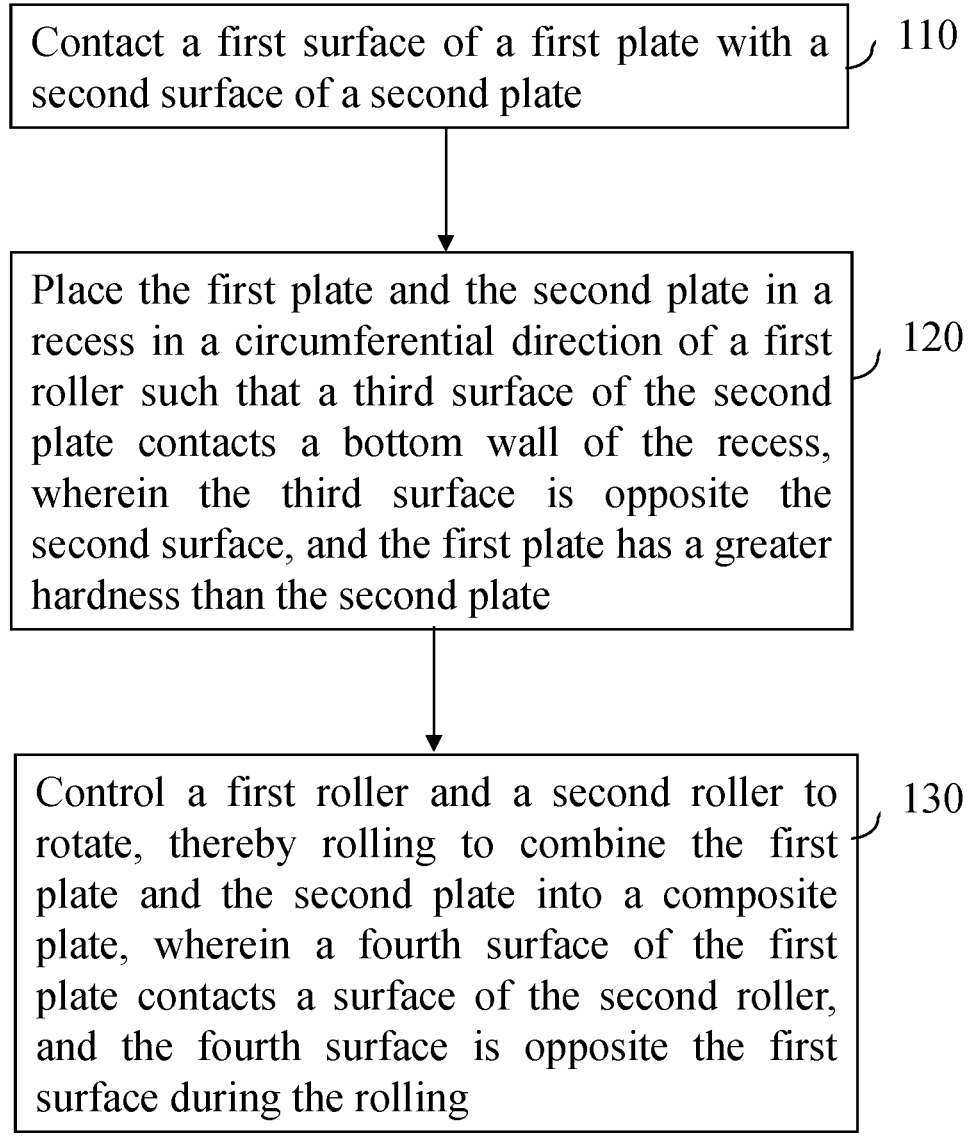
FIG. 1 is a schematic flow chart of a method for making a metal material composite according to the present invention.
Figure 2:
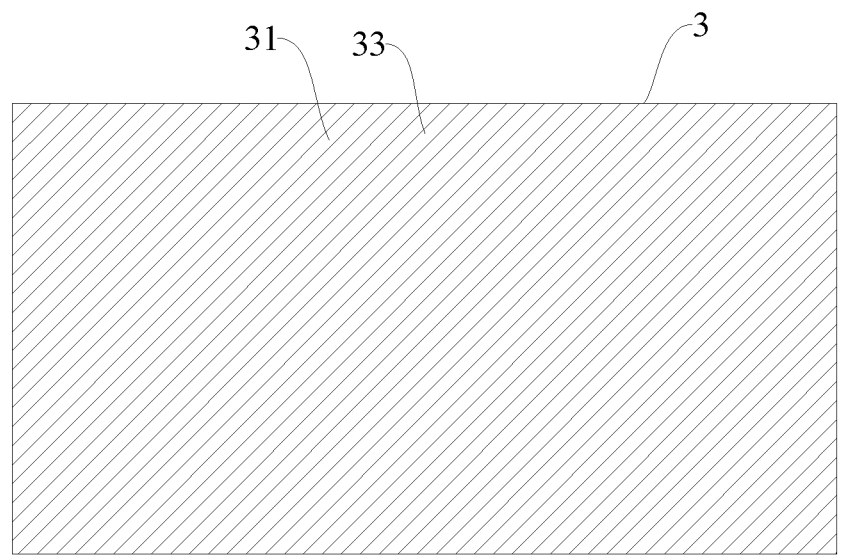
FIG. 2 is a schematic diagram showing a structure of a first surface of a first plate which is rolled in the method for making a metal material composite according to the present invention.
Figure 3:
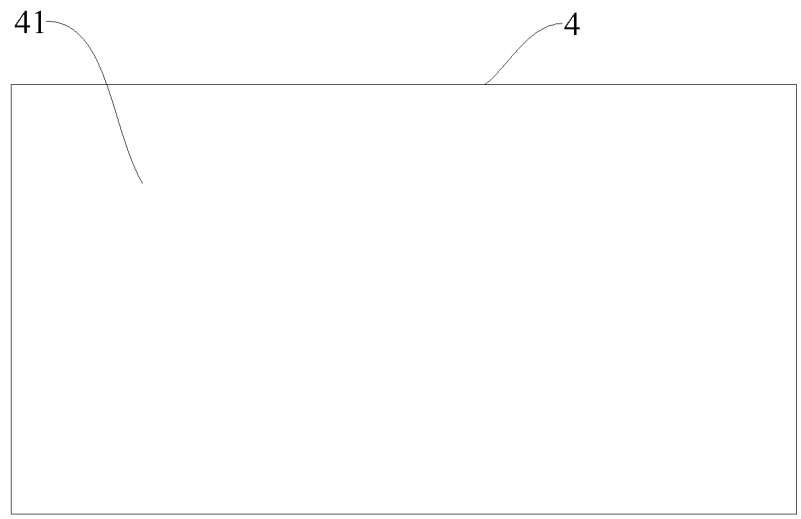
FIG. 3 is a schematic diagram showing a structure of a second surface of a second plate which is rolled in the method for making a metal material composite according to the present invention.
Figure 4:
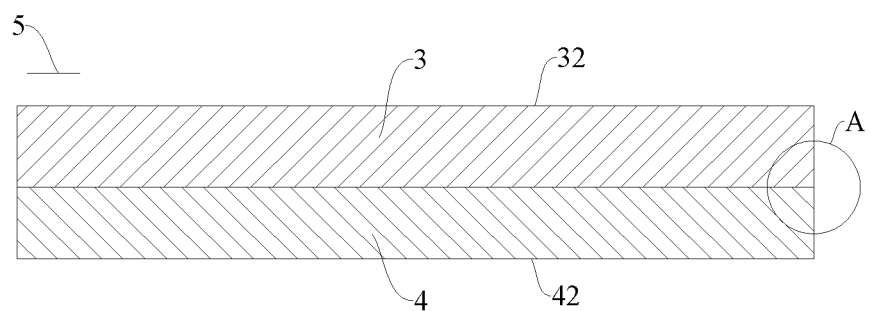
FIG. 4 is a schematic diagram showing a structure of a composite plate obtained by rolling in the method for making a metal material composite according to the present invention.
Figure 5:
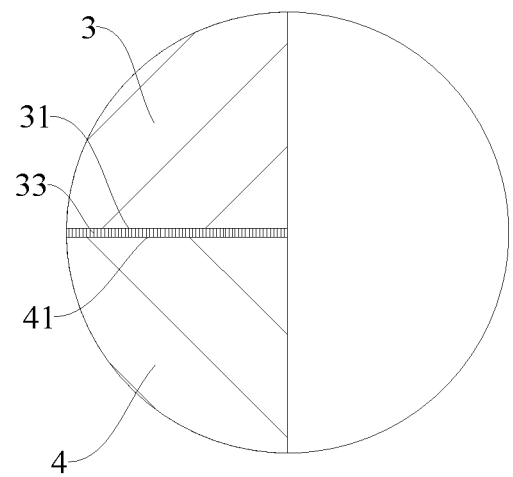
FIG. 5 is a partially enlarged view showing a structure of portion A of FIG. 4.

REFERENCE SIGNS 1. first roller; 11. first roller core; 12. first roller sleeve; 13. recess;
2. second roller; 21. second roller core; 22. second roller sleeve; 23. bump;
3. first plate; 31. first surface; 32. fourth surface; 33. striation;
4. second plate; 41. second surface; 42. third surface;
5. composite plate.

DETAILED DESCRIPTION OF THE INVENTION

In order that the object, technical solutions, and advantages of the present invention are presented clearly enough, the technical solutions of the present invention will be described fully and completely in conjunction with the accompanying drawings. Apparently, the embodiments described are part of the embodiments of the present invention but not all of them. On the basis of the embodiments of the present invention, all other embodiments obtained by those of ordinary skill in the art without inventive work shall fall within the scope of the present invention.

An embodiment of a first aspect of the present invention, as shown in FIGS. 1 to 5, provides a method for making a metal material composite, including the steps as follows.

Step 110, a first surface 31 of a first plate 3 is brought into contact with a second surface 41 of a second plate 4;

the facing surfaces of the first plate 3 and the second plate 4 are brought into contact so that the first plate 3 and the second plate 4 are rolled into a composite plate 5.

Step 120, the first plate 3 and the second plate 4 are placed in a recess 13 in a circumferential direction of a first roller 1, and a third surface 42 of the second plate 4 contacts a bottom wall of the recess 13, wherein the third surface 42 is opposite the second surface 41, and a hardness of the first plate 3 is greater than that of the second plate 4;

the hardness of the second plate 4 is relatively small, so the second plate 4 is easy to deform when forced by the rolling action; the second plate 4 with the relatively small hardness is placed at the bottom of the recess 13, and the second plate 4 can be limited by sidewalls of the recess 13, which avoids burrs and flashings on the side edges of the second plate 4. The first plate 3 is closer to an opening of the recess 13, and during the rolling process, the first plate 3 with a greater hardness is less likely to overflow the recess 13 than the second plate 4, which also effectively avoids burrs and flashings on the side edges of the second plate 4, hence the composite plate 5 formed by rolling the first plate 3 and the second plate 4 is less likely to generate burrs and flashings.

The recess 13 is an annular recess around a circumference of the first roller 1, the first plate 3 and the second plate 4 are placed in the recess 13 and correspond to the second roller 2, and during the rotation of the first roller 1, the first plate 3 and the second plate 4 are always in the recess 13, and the first roller 1 and the second roller 2 cooperate to perform rolling and conveying. Generally, the first roller 1 is positioned below the second roller 2 and after the first plate 3 and the second plate 4 are placed in the recess 13, the second plate 4 is positioned below the first plate 3.

It should be noted that the above-mentioned steps 110 and 120 do not define an order of implementation, which can be determined as appropriate. For example, first of all, the first plate 3 and the second plate 4 are brought into contact, and then the first plate 3 and the second plate 4 are placed in the recess 13; alternatively, the second plate 4 is placed in the recess 13 and then the first plate 3 is placed in the recess 13 such that the second plate 4 contacts the first plate 3, that is, the first surface 31 contacts the second surface 41.

Step 130, the first roller 1 and the second roller 2 are controlled to rotate, thereby rolling to combine the first plate 3 and the second plate 4 into the composite plate 5, wherein the fourth surface 32 of the first plate 3 contacts a surface of the second roller 2 during the rolling process, and the fourth surface 32 is opposite the first surface 31.

The first plate 3 and the second plate 4 are rolled to combine into an integrated composite plate 5, and the composite plate 5 has high structural strength and stable quality. Once the first roller 1 and the second roller 2 are in position, a surface of the second roller 2 contacts the fourth surface 32 in preparation for the rolling process.

Herein, the force of the rolling action between the first roller 1 and the second roller 2 during the rolling process can be adjusted according to the characteristics of the first plate 3 and the second plate 4 and the requirements of machining the composite plate 5.

According to the method for making a metal material composite of this embodiment, the first plate 3 and the second plate 4 to be processed are placed in the recess 13 of the first roller 1, and in the rolling process, the sidewall of the recess 13 limits the first plate 3 and the second plate 4, which effectively avoids flashings and burrs generated on the side edges of the composite plate 5 and in the subsequent process the special steps to remove the flashings and burrs can be omitted, which can be conducive to streamlining the process, shortening the cycle, and reducing the cost. Moreover, the sidewall of the recess 13 cooperates with the first plate 3 having a greater hardness to limit the entire surface of the second plate 4 having a smaller hardness, and thus flashings and burrs generated on the side edges of the second plate 4 can be effectively avoided.

In some embodiments, before step 110, that is, before the step of contacting the first surface 31 of the first plate 3 with the second surface 41 of the second plate 4, at least one of the first surface 31 and the second surface 41 is roughened so that at least one of the first surface 31 and the second surface 41 is provided with a plurality of striations 33, a pitch is provided between adjacent striations 33, and a number of the striations of which every two adjacent ones are distanced by a preset pitch is configured to be greater than or equal to a preset proportion of a total number of the striations.

Herein, the striations 33 are grooves formed in at least one of the first surface 31 and the second surface 41 after the roughening process, and a depth of the groove is associated with the pressure applied to the roughening treatment. The pitch between adjacent striations 33 refers to a distance between the bottoms of two grooves, and a length of the striation 33 refers to how far the striation 33 extends.

In some embodiments, the first surface 31 is roughened such that the first surface 31 is configured with a plurality of striations 33. The roughening treatment increases the surface area of the first surface 31, and in turn, increases the area subjected to rolling of the first plate 3 and the second plate 4, hence a bonding strength of the composite plate 5 formed by bonding the first plate 3 and the second plate 4 is higher, and the bond is stronger. Herein, the more uniform the striations 33 are and the smaller the pitch between two adjacent striations 33 is, the greater the number of the striations 33 per unit area is; the larger the area subjected to rolling of the first plate 3 and the second plate 4 is, the higher the bonding strength is of the composite plate 5 formed by bonding the first plate 3 and the second plate 4.

Since the hardness of the second plate 4 is relatively small, the second plate 4 will deform during the rolling process, the material of the second plate 4 will enter the grooves of the striations 33 of the first plate 3, and after the first plate 3 is cooled, the pitch of the striations 33 is reduced, and the surface of the second plate 4 is in close contact with the surface of the striations 33 of the first plate 3 to form an interference fit, thereby bonding the first plate 3 and the second plate 4 tightly.

In some embodiments, before the step of roughening the first surface 31,
  the first plate 3 is prefabricated to have an elongated shape,
  in the step of roughening the first surface 31,
  controlling the intersection angle between the length direction of the striations 33 of the first surface 31 and the width direction of the first plate 3 to form the first preset intersection angle; or In this embodiment, the preset angle can be but is not limited to 70° to 82°. The striations 33 in the first surface 31 are configured to increase the area of the first plate 3 and the second plate 4 subjected to rolling.

In some embodiments, before the step of roughening the second surface 41, the second plate 4 is prefabricated to have an elongated shape;
  in the step of roughening the second surface 41,
  controlling the intersection angle between the length direction of the striations of the second surface 41 and the width direction of the second plate 4 to form the second preset intersection angle.

In this embodiment, the second surface 41 is configured with a plurality of striations, and the preset angle may be, but is not limited to, 70° to 82°. The striations in the second surface 41 can be configured to evacuate air in the process of rolling to form the composite plate 5, and because of the preset angle between the length direction of the striations and the width direction of the second plate 4, the striations are relatively short. When the second plate 4 and the first plate 3 are subjected to rolling, shorter striations are more advantageous for the evacuation of air between the second plate 4 and the first plate 3, resulting in a higher bonding strength of the composite plate 5. Herein, the second plate 4 has an elongated shape.

Herein, the second preset angle corresponding to the striations of the second plate 4 and the first preset angle corresponding to the striations 33 of the first plate 3 can be equal to ensure better coupling between the second plate 4 and the first plate 3 during the rolling process.

In the above embodiment, the striations 33 are straight striations, and the straight striations are arranged at intervals, and the pitch between two adjacent striations 33 may be consistent or not.

In some embodiments, in the step of roughening the first surface 31,
The striations 33 in the first surface 31 are arranged to have a preset pitch of 0.005 mm to 0.03 mm and a preset proportion of 90%. In other words, the striations 33 of which every two adjacent ones are distanced by a preset pitch of 0.005 mm to 0.03 mm are more than or equal to 90% of all the striations 33. A large range of the preset pitch facilitates machining the striations 33, and satisfies the structural requirements of the composite plate 5. In such an arrangement, the shear strength of the composite plate 5 can reach 210 MPa to 245 MPa.

In some embodiments, in the step of roughening the first surface 31,
The striations 33 in the first surface 31 are arranged to have a preset pitch of 0.01 mm to 0.02 mm and a preset proportion of 90%. In other words, the striations 33 of which every two adjacent ones are distanced by a preset pitch of 0.01 mm to 0.02 mm are more than or equal to 90% of all the striations 33, and in such an arrangement, the shear strength of the composite plate 5 can reach 200 MPa to 230 MPa.

In some embodiments, in the step of roughening the first surface 31,
The striations 33 in the first surface 31 are arranged to have a preset pitch of 0.01 mm to 0.02 mm and a preset proportion of 80%. In other words, the striations 33 of which every two adjacent ones are distanced by a preset pitch of 0.01 mm to 0.02 mm are more than or equal to 80% of all the striations 33, and in such an arrangement, the shear strength of the composite plate 5 can reach 190 MPa to 225 MPa.

In some embodiments, in the step of roughening the first surface 31,
The striations 33 in the first surface 31 are arranged to have a preset pitch of 0.01 mm to 0.02 mm and a preset proportion of 70%. In other words, the striations 33 of which every two adjacent ones are distanced by a preset pitch of 0.01 mm to 0.02 mm are more than or equal to 70% of all the striations 33, and in such an arrangement, the shear strength of the composite plate 5 can reach 185 MPa to 220 MPa.

In some embodiments, in the step of roughening the first surface 31,
The striations 33 on the first surface 31 are arranged to have a preset pitch of 0.01 mm to 0.02 mm and a preset proportion of 50%. In other words, the striations 33 of which every two adjacent ones are distanced by a preset pitch of 0.01 mm to 0.02 mm are more than or equal to 50% of all the striations 33, and in such an arrangement, the shear strength of the composite plate 5 can reach 170 MPa to 210 MPa.

In some embodiments, in the step of roughening the first surface 31,
The striations 33 on the first surface 31 are arranged to have a preset pitch of 0.01 mm to 0.02 mm and a preset proportion of 40%. In other words, the striations 33 of which every two adjacent ones are distanced by a preset pitch of 0.01 mm to 0.02 mm are more than or equal to 40% of all the striations 33.

Note that the more uniformly the striations 33 are arranged, the higher the bonding strength is of the composite plate 5 formed by bonding the first plate 3 and the second plate 4.

In some embodiments, in the step of roughening at least one of the first surface 31 and the second surface 41,
the striations are formed by rubbing at least one of the first surface 31 and the second surface 41 with a roughening friction roller.

The roughening treatment is to form groove-style straight striations in at least one of the first surface 31 and the second surface 41. Herein, the roughening friction roller includes a steel wire brush roller or a grinding wheel. The roughening treatment may be performed once, or may be performed two or more times.

The roughening friction roller forms striations by friction when contacting the first surface 31 or the second surface 41, and since the roughening friction roller rotates at a constant speed and the first plate 3 and the second plate 4 move at a constant speed in a second direction, the striations formed on at least one of the first surface 31 and the second surface 41 are straight striations that are arranged at intervals. Moreover, a first preset angle is included between the straight striations of the first surface 31 and the width direction of the first plate 3, or a second preset angle is included between the straight striations of the second surface 41 and the width direction of the second plate 4.

In some embodiments, during roughening at least one of the first surface 31 and the second surface 41,
a grinding belt, the linear speed of the grinding belt: 9-10 m/S, the speed of the titanium plate is 4-6 m/min, the overlapping amount of the grinding belt is 0.02 mm, the material of the grinding belt support roller is rubber, the hardness is HS60-75. The striations 33 are formed by friction, and since the roughening friction roller rotates at a constant speed and the first plate 3 and the second plate 4 move at a constant speed in a second direction, the striations formed on at least one of the first surface 31 and the second surface 41 are straight striations that are arranged at intervals so that a preset angle is included between the straight striations and the width direction of the first plate 3 or the second plate 4. The pitch between two adjacent striations and the proportion satisfy the above requirements. The roughening treatment may be performed once, or may be performed two or more times.

In some embodiments, in the step of roughening at least one of the first surface 31 and the second surface 41,
The roughening friction roller includes a grinding wheel, the grinding wheel has a mesh number of 40 to 120, the pressure applied to the grinding wheel during operation is 0.1 MPa to 0.5 MPa, and a diameter of the grinding wheel is 200 mm to 400 mm.

In some embodiments, in the step of roughening the first surface 31,
debris is removed from the first surface 31;
In some embodiments, in the step of roughening the second surface 41,
debris is removed from the second surface 41.

Debris on the first surface 31 or the second surface 41 can be removed during the rotation of a dedusting roller; when the first plate 3 or the second plate 4 moves to a position between upper and lower rows of air jets, the air jets emit a high-speed air flow to the first plate 3 or the second plate 4 to further remove the debris from the first surface 31 or the second surface 41 so that the surface of the first plate 3 or the second plate 4 is clean and a camera can capture a clear image, without influence on combining the first plate 3 and the second plate 4.

In some embodiments, in the step of roughening the first surface 31,
the number of the striations per unit area of the first surface 31 is acquired;
the number of the striations per unit area of the first surface 31 is determined to be smaller than a corresponding preset value, and a position of the roughening friction roller for roughening treatment is adjusted so that the roughening friction roller fully contacts the first surface 31.

A control terminal can calculate the number of the striations per unit area according to the acquired image information, and when the number of the striations per unit area of the first surface 31 is determined to be smaller than the corresponding preset value, the control terminal sends a control instruction to a controller, and the controller controls a lifting component to rise according to the control instruction thereby increasing the height of the roughening friction roller and bringing the roughening friction roller into close contact with the first surface 31.

If the number of the striations per unit area of the first surface 31 is determined to be greater than the corresponding preset value, then the roughening friction roller is in good contact with the first surface 31, without the need to adjust the position of the roughening friction roller.

Similarly, in the step of roughening the second surface 41,
the number of the striations per unit area of the second surface 41 is acquired;
the number of the striations per unit area of the second surface 41 is determined to be smaller than a corresponding preset value, and a position of the roughening friction roller for roughening treatment is adjusted so that the roughening friction roller fully contacts the second surface 41.

If the number of the striations per unit area of the second surface 41 is determined to be greater than the corresponding preset value, then the roughening friction roller is in good contact with the second surface 41, without the need to adjust the position of the roughening friction roller.

Note that the step of acquiring the number of the striations per unit area of the first surface 31 or the second surface 41 is generally performed after removing the debris.

In some embodiments, before the step of controlling the first roller 1 and the second roller 2 to rotate, thereby rolling to combine the first plate 3 and the second plate 4 into the composite plate 5, the method further includes:
controlling the first plate 3 and the second plate 4 to be heated to a preset temperature.

An on-line heating method is used in the process of heating the first plate 3 and the second plate 4, specifically, an eddy current heating method is used, and the first plate 3 is heated at 350° C. The first surface 31 of the first plate 3 and the second surface 41 of the second plate 4 can be rolled to combine in a semi-molten state to further improve the bonding strength of the composite plate 5.

In the embodiment of the invention, the online heating method is applied to heating the first plate 3, i.e., the stainless steel plate, to thermally expand the striations 33 in the first surface 31, so that the grooves of the striations 33 widen and deepen. After this, the heated stainless steel plate and an aluminum alloy plate with a relatively low hardness are rolled to combine by upper and lower rollers, the aluminum alloy plate is pressed into the groove in the stainless steel surface on a composite surface where the aluminum alloy plate and the stainless steel plate are combined because of a much greater hardness of the stainless steel plate than that of the aluminum alloy plate; moreover, the stainless steel plate is cooled to shrink, and the surface of the aluminum alloy plate is heated to expand, so that the stainless steel plate and the aluminum alloy plate are closely attached on both sides of the groove to form an interference fit, thereby forming a strong bonding between the stainless steel plate and the aluminum alloy plate.

According to an embodiment of the present invention, after the step of controlling the first roller 1 and the second roller 2 to rotate, thereby rolling to combine the first plate 3 and the second plate 4 into the composite plate 5, the method further includes the steps as follows.

Step 140, the composite plate 5 is subjected to a solid solution treatment;

wherein the solid solution treatment includes a heating stage and a cooling stage, and in the heating stage, the composite plate 5 is put into a solid solution furnace for the solid solution treatment, the solid solution treatment is performed at 480° C. to 540° C. for 45 min to 65 min. In the cooling stage, the composite plate 5 is rapidly cooled and the composite plate 5 is finally cooled to normal temperature. By subjecting the composite plate 5 to the solid solution treatment, the bonding strength of the composite plate 5 is further improved.

Step 150, the composite plate 5 after the solid solution treatment is aged.

An aging treatment is required after the solid solution treatment of the composite plate 5. The aging treatment is performed in an aging furnace at 160° C. to 200° C. for 5 h to 7 h. By aging the composite plate, the bond strength of the composite plate can be further improved.

In some embodiments, the method further includes, before the step of contacting the first surface 31 of the first plate 3 with the second surface 41 of the second plate 4, prefabricating the first plate 3 and the second plate 4 in a thickness ratio of 1.5:1.0; and in the step of controlling the first roller 1 and the second roller 2 to rotate, thereby rolling to combine the first plate 3 and the second plate 4 into the composite plate, controlling a differential speed ratio of the first roller 1 to the second roller 2 to be 1:1.05, and a reduction rate of rolling to be 20% to 40%.

Herein, the first roller 1 and the second roller 2 can be asynchronous rolling, which refers to a process of rolling the stainless steel plate and the aluminum alloy plate (i.e., the first plate 3 and the second plate 4) into a composite plate by rolling with upper and lower rollers, and the first roller 1 rotating at a different speed from the second roller 2.

In some embodiments, before step 110, i.e., the step of contacting the first surface 31 of the first plate 3 with the second surface 41 of the second plate 4, the surface roughness of the first surface 31 is prefabricated to be 0.8 Ra to 4.0 Ra. where Ra is an arithmetic average roughness.

By controlling the surface roughness of the first surface 31, the contact area between the first surface 31 and the second surface 41 can be ensured, thereby ensuring the effect of rolling and fixing the first plate 3 and the second plate 4.

In some embodiments, before step 110, i.e., the step of contacting the first surface 31 of the first plate 3 with the second surface 41 of the second plate 4, the surface roughness of the second surface 41 is prefabricated to be 4 Ra to 10 Ra, where Ra is the arithmetic average roughness.

The first surface 31 and the second surface 41 cooperate to effectively improve the hardness of the composite plate 5, satisfy the requirements of machining the composite plate 5, and further satisfy the requirements of manufacturing a cell phone frame.

In some embodiments, before step 110, i.e., the step of contacting the first surface 31 of the first plate 3 with the second surface 41 of the second plate 4, the first plate 3 is prefabricated to have a hardness of HV 270 to HV 330, where HV is the Vickers hardness in kg/mm$^2$.

Vickers hardness is defined as the ratio of a load to an area of indentation formed on a surface of a specimen when a positive tetragonal diamond indenter is pressed into the surface of the specimen with the load and held for a while before unloading the test force.

The first plate 3 is prefabricated to have a hardness of HV 270 to HV 330 so that the hardness of the final composite plate 5 satisfies the requirement.

In some embodiments, in step 130, i.e., the step of controlling the first roller 1 and the second roller 2 to roll and combine the first plate 3 and the second plate 4 into the composite plate 5, a shear strength of the composite plate 5 is $a*b*K1*K2*\sigma_{soft}$;

where a is a length of the second plate 4, b is a width of the second plate 4, K1 is a roughening area ratio of the second plate 4, and a value range of K1 is 1.5 to 3; K2 is a degree of bonding between the first plate 3 and the second plate 4, a value range of K2 is 0.15 to 0.3, and when K1*K2>1, a product of K1 and K2 takes a value of 1; the $\sigma_{soft}$ is a yield strength of the first plate 3, and a value range of the $\sigma_{soft}$ is 350 MPa to 412 MPa.

The composite plate 5 can be applied to the cell phone frame and others that require a high shear strength.

In some embodiments, the first plate 3 is a stainless steel plate and the second plate 4 is an aluminum plate. The stainless steel plate and the aluminum plate are rolled to combine into the composite plate 5, and the shear strength of the composite plate 5 is optimized to make the composite plate 5 stronger.

The first plate 3 is a stainless steel plate, including a stainless steel plate containing various alloy components and a stainless steel plate containing various nonmetal elements, or a stainless steel plate containing various metallographic structures. The second plate 4 is an aluminum alloy plate, including an aluminum alloy plate containing various alloys and various proportions of components.

Certainly, the materials of the first plate 3 and the second plate 4 are not limited thereto, and can be determined as appropriate. A specific embodiment of the invention is described below with reference to FIGS. 1 to 5, the composite plate 5 is formed by rolling the first plate 3 and the second plate 4, wherein the first plate 3 is a stainless steel plate and the second plate 4 is an aluminum plate. The first surface 31 of the stainless steel plate is configured with the striations 33, wherein the striations 33 are straight striations arranged at intervals. The striations 33 of which the adjacent ones have a pitch of 0.02 mm account for more than 90% of all the striations 33. The stainless steel plate has an elongated shape, an angle of 78° is included between a length direction of the striations 33 and a width direction of the stainless steel plate, the hardness of the stainless steel plate is HV 300, and the roughness of the first surface 31 of the stainless steel plate is 2 Ra.

The second surface 41 of the aluminum alloy plate is also configured with the striations, and a thickness ratio of the stainless steel plate to the aluminum alloy plate is 1.5:1.0. The striations of the aluminum alloy plate are also straight striations arranged at intervals. The striations of which the adjacent ones have a pitch of 0.02 mm account for more than 90% of all the striations. The aluminum alloy plate has an elongated shape as well, an angle of 78° is included between a length direction of the striations and a width direction of the aluminum alloy plate, and the roughness of the second surface 41 of the stainless steel plate is 3 Ra.

The first surface 31 of the stainless steel plate and the second surface 41 of the aluminum alloy plate are rolled to combine and form the composite plate 5, the shear strength of the composite plate 5 satisfies $a*b*K1*K2*\sigma_{soft}$, a is a length of the stainless steel plate, b is a width of the stainless steel plate, K1 is a roughened area ratio of the stainless steel plate, and K1 takes a value of 2; K2 is a degree of bonding between the stainless steel plate and the aluminum alloy plate, and K2 takes a value of 0.2; when $K1*K2>1$, the product of K1 and K2 takes a value of 1; $\sigma_{soft}$ is the yield strength of aluminum alloy plate, and $\sigma_{soft}$ takes a value of 380 MPa.

By roughening the first surface 31 of the first plate 3, the first surface 31 is configured with the striations 33, which increases the area of the second plate 4 and the first plate 3 subjected to rolling, so that the bonding strength of the composite plate 5 after the second plate 4 and the first plate 3 are rolled to combine is higher and the bonding is stronger. The composite plate 5 produced by rolling according to the embodiment of the present invention is capable of bearing a large shearing force, and the composite plate 5 is bonded more tightly and structurally strong, which satisfies the design requirement. The composite plate 5 can be used as a material for a cell phone frame, where it features a minimal signal shielding rate and a low strength-weight ratio.

An embodiment of a second aspect of the present invention, illustrated in conjunction with FIGS. 6 to 11, further provides a rolling device, including the first roller 1 configured with a circumferential recess 13 and the second roller 2 adapted to co-roll with the first roller 1.

The first roller 1 and the second roller 2 rotate relative to each other to roll and convey the machined workpiece. The first roller 1 is provided with a circumferential recess 13, so that the workpiece always remains in the recess 13 during the rolling, and the workpiece is limited by the walls of the recess 13, which solves the problem of flashings and burrs on the side of the workpiece, optimizes the rolling effect, and saves an additional process of removing flashings and burrs.

The method for making metal material composit of the above embodiment can be performed by the rolling device of this embodiment and the following embodiments. That is to say, the first plate 3 and the second plate 4 are placed in the recess 13 and rolled by the first roller 1 and the second roller 2.

In some embodiments, illustrated with reference to FIGS. 6 and 7, the second roller 2 is configured with a circumferential bump 23 adapted to be inserted into the recess 13. The bump 23 and the recess 13 cooperate to limit the machined workpiece in the recess 13, and effectively prevent an overflow of the machined workpiece from a gap between the first roller 1 and the second roller 2 so that flashings and burrs generated from the machined workpiece are effectively avoided.

Herein, the bump 23 is provided around the circumference of the second roller 2, and the bump 23 must cover an opening of the recess 13 at the position over which the first roller 1 and the second roller 2 roll, thereby ensuring the machining effect.

Figure 6:
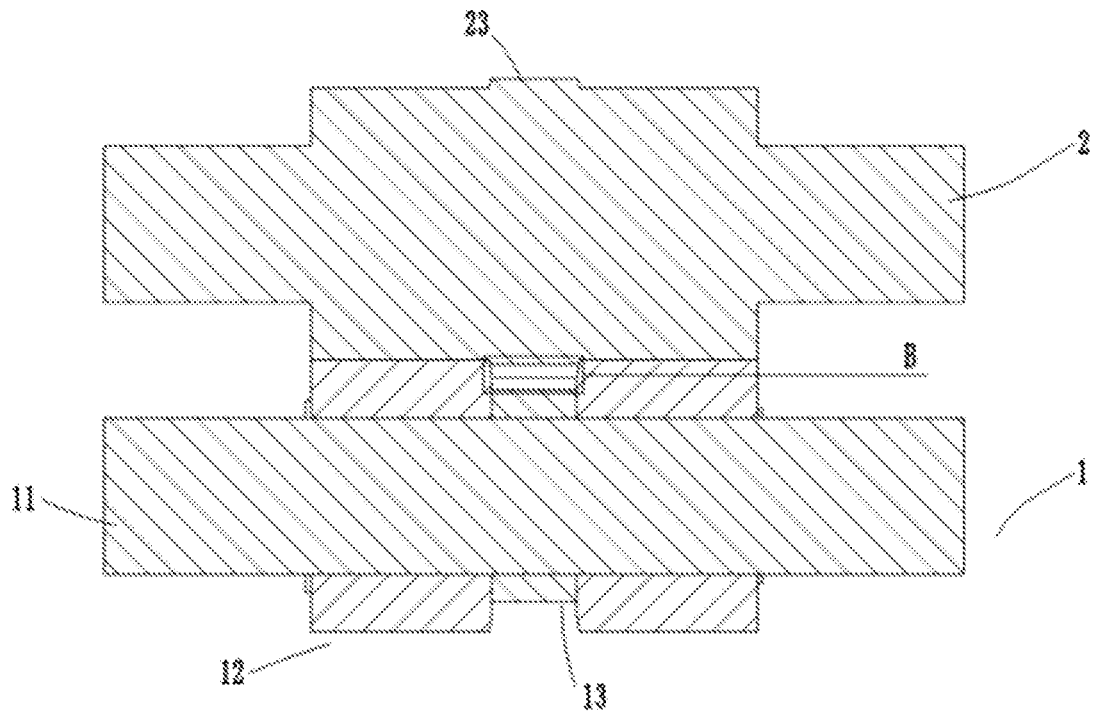
FIG. 6 is a schematic cross-sectional view showing a structure of a first rolling device according to the present invention.
Figure 8:
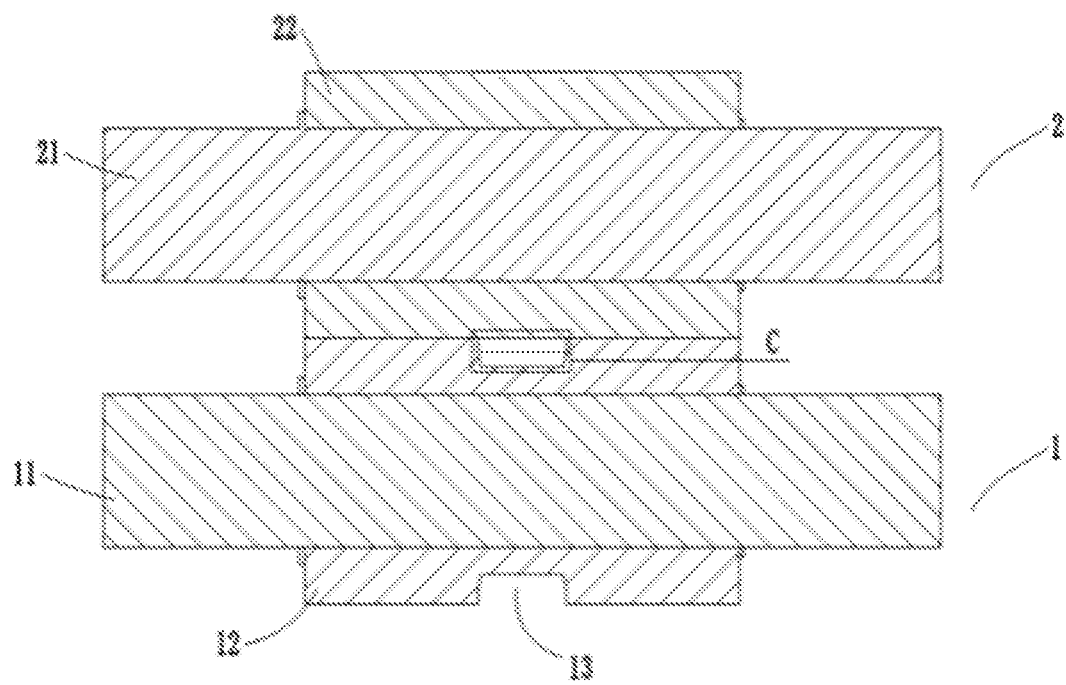
FIG. 8 is a schematic cross-sectional view showing a structure of a second rolling device according to the present invention.
Figure 10:
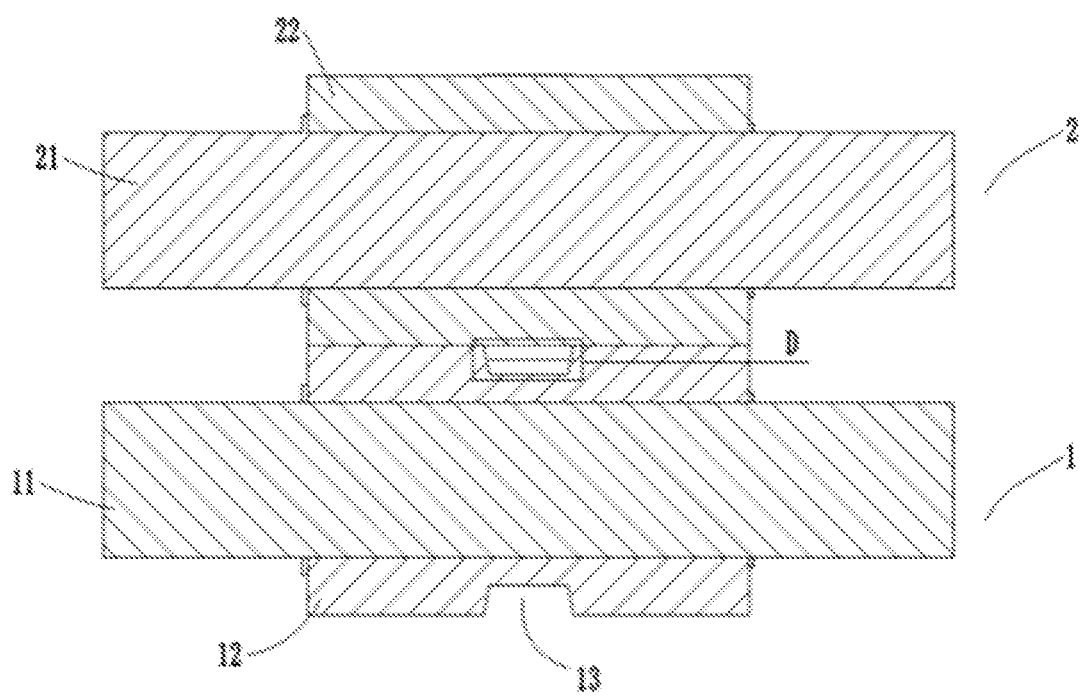
FIG. 10 is a schematic cross-sectional view showing a structure of a third rolling device according to the present invention.

In some embodiments, as shown with reference to FIGS. 6, 8 and 10, at least one of the first roller 1 and the second roller 2 includes a roller core and a roller sleeve sheathed outside the roller core to facilitate independent replacement of the roller core or the roller sleeve.

The roller core can be replaced when defects occur on its surface, and a material with better surface properties can be preferred to manufacture the roller core, which is economical and durable.

With reference to FIGS. 6, 8, and 10, the first roller 1 includes a first roller core 11 and a first roller sleeve 12, and an annular recess 13 is formed around the circumference of the first roller sleeve 12.

Certainly, as shown with reference to FIG. 8, the second roller 2 may be configured to include a second roller core 21 and a second roller sleeve 22, and an annular bump 23 is formed around the circumference of the second roller sleeve 22.

In some embodiments, the roller sleeve and roller core may be connected through a single key or spline (not shown), the core may be provided with a circlip at both ends of the roller sleeve, or a shoulder at one end and a circlip at the other end of the roller sleeve. The single key or spline allows no relative rotation between the roller core and the roller cover in a circumferential direction and facilitates mounting or the roller sleeve onto or removing the same from the roller core. The shoulder cooperates with the circlip such that the roller sleeve does not slide in an axial direction of the roller core.

In other embodiments, the roller sleeve is threaded to connect the roller core, the roller core is provided with a tightening nut at both ends of the roller sleeve, or the roller core is provided with a shoulder at one end and a tightening nut at the other end of the roller sleeve. The roller sleeve is mounted on or removed from the roller core by means of a threaded connection, and the arrangement of the tightening nut and the roller sleeve ensures that the roller sleeve is not slidable in the axial direction of the roller core.

In some embodiments, a width of the recess 13 increases from a bottom wall to the opening of the recess 13. With reference to FIGS. 6 to 11, the recess 13 has a greater upper width than a lower width, so that the workpiece in the recess 13 can be easily knocked out.

Herein, the width in the direction from the bottom wall to the opening of the recess 13, i.e., in a vertical direction of the recess 13, is a distance between the facing sidewalls. The width increase may be a gradual increase or a stepwise increase.

Figure 7:
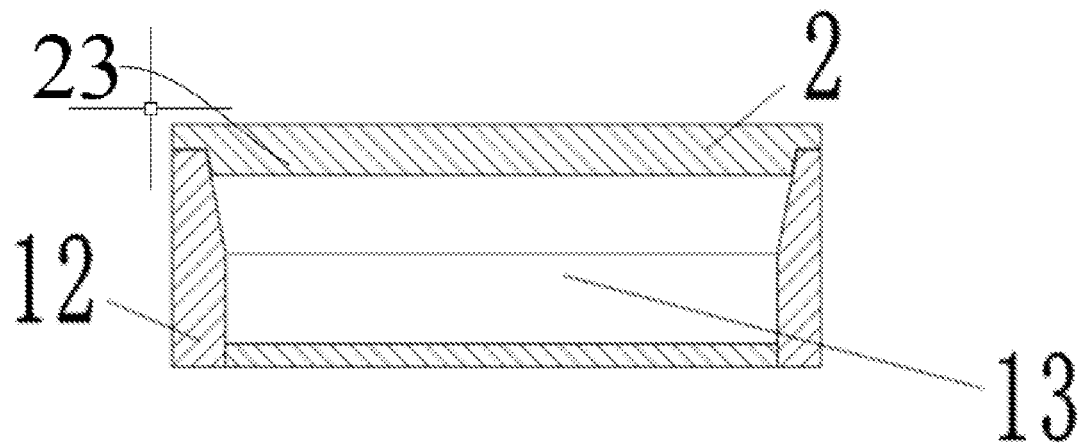
FIG. 7 is a partially enlarged view showing a structure of portion B of FIG. 6.
Figure 9:
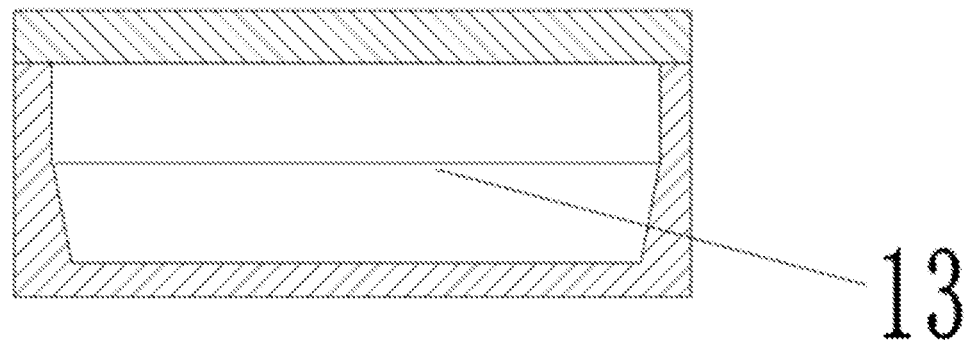
FIG. 9 is a partially enlarged view showing a structure of portion C of FIG. 8.
Figure 11:
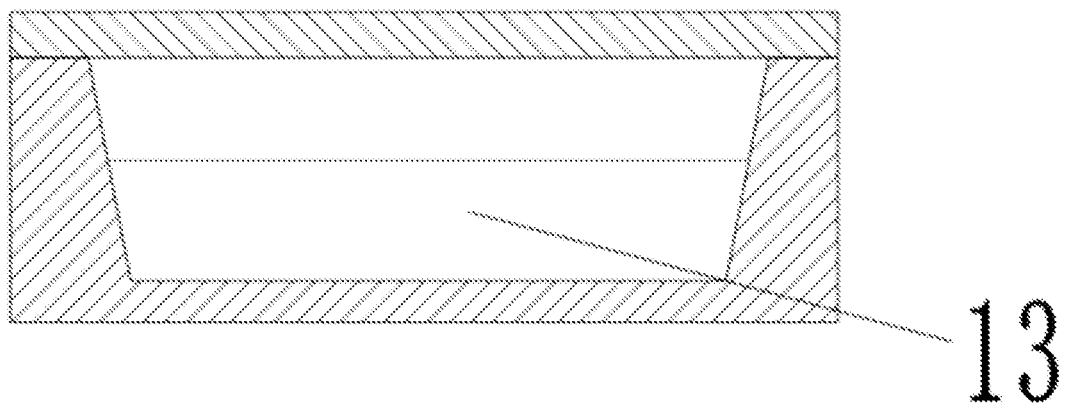
FIG. 11 is a partially enlarged view showing a structure of portion D of FIG. 10.

With reference to FIGS. 6 and 7, the sidewall of the recess 13 includes an annular segment perpendicular to the bottom wall of the recess 13 and a conical segment having an angle relative to the annular segment, the annular segment being connected to the bottom wall of the recess 13; with reference to FIGS. 8 and 9, the sidewall of the recess 13 includes an annular segment perpendicular to the bottom wall of the recess 13 and a conical segment having an included angle relative to the annular segment, the conical segment being connected to the bottom wall of the recess 13; with reference to FIGS. 10 and 11, the sidewall of the recess 13 is a conical surface.

In some embodiments, at least one sidewall of the recess 13 is configured with a bevel having an angle of 94° to 96° relative to the bottom wall of the recess 13. The range of the angle of the bevel relative to the bottom wall of the recess 13 has little influence on the structure of the side edge of the workpiece and facilitates knocking out the workpiece.

With reference to FIGS. 6 to 9, the annular segment and the conical segment have an included angle of 184° to 186°; with reference to FIGS. 10 and 11, the conical surface has an angle of 94° to 96° relative to the bottom wall.

Finally, it should be noted that the above embodiments are merely illustrative of the technical solution of the present invention, rather than limiting it; although the present invention has been described in detail with reference to the foregoing embodiments, those skilled in the art will appreciate that the technical solution disclosed in the above-mentioned embodiments can still be modified, or some of the technical features thereof can be replaced by equivalents; such modifications and equivalents do not depart from the spirit and scope of the embodiments of the present invention in nature.

The invention claimed is:

1. A method for making a metal material composite, characterized by comprising:
    contacting a first surface of a first plate with a second surface of a second plate, wherein the first plate is a titanium plate, and;
    placing the first plate and the second plate in a recess in a circumferential direction of a first roller such that a third surface of the second plate contacts a bottom wall of the recess, wherein the third surface is opposite the second surface, and the first plate has a greater hardness than the second plate; and
    controlling a first roller and a second roller to rotate, thereby rolling to combine the first plate and the second plate into a composite plate, wherein a fourth surface of the first plate contacts a surface of the second roller, and the fourth surface is opposite the first surface during the rolling, wherein before contacting a first surface of a first plate with a second surface of a second plate, at least one of the first surface and the second surface is roughened so that at least one of the first surface and the second surface is provided with a plurality of striations, a pitch is provided between adjacent striations, and a number of the striations of which every two adjacent ones are distanced by a preset pitch is configured to be greater than or equal to a preset proportion of a total number of the striations.

2. The method for making a metal material composite according to claim 1, wherein in the step of roughening the first surface, the preset pitch between the adjacent striations of the first surface is 0.005 mm to 0.03 mm, and the preset proportion is 90%.

3. The method for making a metal material composite according to claim 1, wherein in the step of roughening the first surface, the preset pitch between the adjacent striations of the first surface is 0.01 mm to 0.02 mm, and the preset proportion is 90%.

4. The method for making a metal material composite according to claim 1, wherein in the step of roughening the first surface, the preset pitch between the adjacent striations of the first surface is 0.01 mm to 0.02 mm, and the preset proportion is 80%.

5. The method for making a metal material composite according to claim 1, wherein in the step of roughening the first surface, the preset pitch between the adjacent striations of the first surface is 0.01 mm to 0.02 mm, and the preset proportion is 70%.

6. The method for making a metal material composite according to claim 1, wherein in the step of roughening the first surface, the preset pitch between the adjacent striations of the first surface is 0.01 mm to 0.02 mm, and the preset proportion is 50%.

7. The method for making a metal material composite according to claim 2, wherein in the step of roughening at least one of the first surface and the second surface, the striations are formed by rubbing at least one of the first surface and the second surface with a roughening friction roller, wherein the roughening friction roller comprises a grinding belt, the linear speed of the grinding belt: 9-10 m/S, the speed of the titanium plate is 4-6 m/min, the overlapping amount of the grinding belt is 0.02 mm, the material of the grinding belt support roller is rubber, the hardness is HS60-75.

8. The method for making a metal material composite according to claim 1, wherein in the step of roughening at least one of the first surface and the second surface, the striations are formed by rubbing at least one of the first surface and the second surface with the roughening friction roller, wherein the roughening friction roller comprises a grinding wheel, a mesh number of the grinding wheel is 40 to 120, the grinding wheel is subjected to a pressure of 0.1 MPa to 0.5 MPa during operation, and a diameter of the grinding wheel is 200 mm to 400 mm.

9. The method for making a metal material composite according to claim 1, wherein the step of roughening the first surface comprises: removing debris from the first surface; and
    the step of roughening the second surface comprises: removing debris from the second surface.

10. The method for making a metal material composite according to claim 1, wherein the step of roughening the first surface comprises:
    acquiring a number of the striations per unit area of the first surface, and
    determining that the number of the striations per unit area of the first surface is smaller than a corresponding preset value, and adjusting a position of the roughening friction roller for roughening treatment so that the roughening friction roller fully contacts the first surface; and
    the step of roughening the second surface comprises:
    acquiring a number of the striations per unit area of the second surface, and
    determining that the number of the striations per unit area of the second surface is smaller than a corresponding preset value, and adjusting a position of the roughening friction roller for roughening treatment so that the roughening friction roller fully contacts the second surface.

11. The method for making a metal material composite according to claim 1, before the step of controlling a first roller and a second roller to rotate, thereby rolling to combine the first plate and the second plate into a composite plate, further comprising:
    heating the first plate and the second plate to a preset temperature.

12. The method for making a metal material composite according to claim 1, after the step of controlling a first roller and a second roller to rotate, thereby rolling to combine the first plate and the second plate into a composite plate, further comprising:
    subjecting the composite plate to a solid solution treatment; and
    subjecting the composite plate to an aging treatment after the solid solution treatment.

13. The method for making a metal material composite according to claim 12, wherein the solid solution treatment is performed at 480° C. to 540° C. for 45 min to 65 min;

the aging treatment is performed at 160° C. to 200° C. for 5 h to 7 h.

14. The method for making a metal material composite according to claim 1, wherein before the step of contacting the first surface of the first plate with the second surface of the second plate, a roughness of the first surface is prefabricated to be 0.8 Ra to 4.0 Ra.

15. The method for making a metal material composite according to claim 1, wherein before the step of contacting the first surface of the first plate with the second surface of the second plate, a roughness of the second surface is prefabricated to be 4 Ra to 10 Ra.

16. The method for making a metal material composite according to claim 1, wherein the second plate is an aluminum plate.

17. The method for making a metal material composite according to claim 1, wherein before the step of roughening the first surface, the first plate is prefabricated to have an elongated shape;
    in the step of roughening the first surface, controlling the intersection angle between the length direction of the striations of the first surface and the width direction of the first plate to form the first preset intersection angle; or
    before the step of roughening the second surface, the second plate is prefabricated to have an elongated shape;
    in the step of roughening the second surface, controlling the intersection angle between the length direction of the striations of the second surface and the width direction of the second plate to form the second preset intersection angle.

18. A method for making a metal material composite characterized by comprising:
    contacting a first surface of a first plate with a second surface of a second plate, wherein the first plate is a titanium plate;
    placing the first plate and the second plate in a recess in a circumferential direction of a first roller such that a third surface of the second plate contacts a bottom wall of the recess, wherein the third surface is opposite the second surface, and the first plate has a greater hardness than the second plate; and
    controlling a first roller and a second roller to rotate, thereby rolling to combine the first plate and the second plate into a composite plate, wherein a fourth surface of the first plate contacts a surface of the second roller, and the fourth surface is opposite the first surface during the rolling,
    wherein before the step of contacting the first surface of the first plate with the second surface of the second plate, prefabricating the first plate and the second plate in a thickness ratio of 1.5:1.0; and
    wherein in the step of controlling the first roller and the second roller to rotate, thereby rolling to combine the first plate and the second plate into the composite plate, controlling a differential speed ratio of the first roller to the second roller to be 1:1.05, and a reduction rate of rolling to be 20% to 40%.

19. A method for making a metal material composite, characterized by comprising:
    contacting a first surface of a first plate with a second surface of a second plate, wherein the first plate is a titanium plate, and;
    placing the first plate and the second plate in a recess in a circumferential direction of a first roller such that a third surface of the second plate contacts a bottom wall of the recess, wherein the third surface is opposite the second surface, and the first plate has a greater hardness than the second plate; and
    controlling a first roller and a second roller to rotate, thereby rolling to combine the first plate and the second plate into a composite plate, wherein a fourth surface of the first plate contacts a surface of the second roller, and the fourth surface is opposite the first surface during the rolling, wherein in the step of controlling the first roller and the second roller to roll and combine the first plate and the second plate into the composite plate,
    a shear strength $\tau = a*b*K1*K2*\sigma_{soft}$ is obtained for the composite plate,
    wherein a is a length of the first plate, b is a width of the first plate, K1 is a roughened area ratio of the first plate, and a value range of K1 is 1.5 to 3; K2 is a degree of bonding between the first plate and the second plate, a value range of K2 is 0.15 to 0.3, and when $K1*K2>1$, a product of K1 and K2 takes a value of 1; the $\sigma_{soft}$ is a yield strength of the second plate, and a value range of the $\sigma_{soft}$ is 350 MPa to 412 MPa.

* * * * *